United States Patent [19]

Kurita et al.

[11] Patent Number: 4,839,452
[45] Date of Patent: Jun. 13, 1989

[54] POLYORGANOSILOXANE COMPOSITION

[75] Inventors: Atsushi Kurita; Yasuji Matsumoto, both of Ohta; Sam Huy, Minato, all of Japan

[73] Assignee: Toshiba Silicone Co., Ltd., Japan

[21] Appl. No.: 212,464

[22] Filed: Jun. 28, 1988

[30] Foreign Application Priority Data

Jul. 3, 1987 [JP] Japan ................... 62-165516

[51] Int. Cl.$^4$ ............................................. C08G 77/06
[52] U.S. Cl. ........................................ 528/15; 528/31; 528/32; 525/478
[58] Field of Search .................. 528/15, 31, 32, 478

[56] References Cited

U.S. PATENT DOCUMENTS 4,032,502  6/1977  Lee et al. ........................ 528/15
4,605,722  8/1986  Suzuki ............................. 528/15

Primary Examiner—Melvyn I. Marquis

[57] ABSTRACT

An addition curable polyorganosiloxane composition is stabilized against premature cure at room temperature by the presence of one or more compounds selected from the group consisting of (i) a silane compound represented by the following general formula:

$$(R^4)_n Si(OR^5)_{4-n}$$

in which $R^4$ represents a member selected from the group consisting of a hydrogen atom and a substituted or unsubstituted monovalent hydrocarbon group; $R^5$ represents a substituted or unsubstituted monovalent hydrocarbon group containing a —C≡C— bond; "n" represents an integer of from 1 to 3; and at least one member selected from the group consisting of Si—H, Si—CH=CH$_2$ and Si—C≡CH bonds is contained in the molecule and (ii) an organosilane compound obtainable by subjecting the above silane compound to addition reaction between Si-H and —C≡C— bonds contained therein.

The composition is highly stable at room temperature and can be stored for extended periods of time.

5 Claims, No Drawings

POLYORGANOSILOXANE COMPOSITION

The present application claims the priority of Japanese Patent Application Serial No. 62-165516 filed on July 3, 1987.

BACKGROUND OF THE INVENTION

The present invention relates to a polyorganosiloxane composition containing a storage stabilizer having a specific chemical structure. More particularly, it relates to a polyorganosiloxane composition which exhibits excellent storage stability at room temperature and can be quickly crosslinked or cured through addition reaction by heating.

There have been proposed various addition-curable compositions (or compositions capable of being cured through addition reaction) which contain mainly of an alkenyl group-containing polyorganosiloxane, a polyorganohydrogensiloxane and a platinum catalyst and incorporated with an additive for providing storage stability to the composition at room temperature. It is required that such compositions can be stored stably for a long period of time at room temperature, even after all the components have been mixed, and that such compositions can be cured only heating.

Known storage stabilizers for addition curable compositions include benzotriazoles, such as those described in Japanese Patent Publication No. 25,069/65; acetylene group-containing alcohols, such as those described in U.S. Pat. No. 3,445,420; and acrylonitriles, such as those described in Japanese Patent Publication No. 22,018/60. However, these known storage stabilizers are unsatisfactory in their stabilizing effects. Even when the known stabilizers are used, the viscosity of such compositions gradually increases or the compositions turn into gel when stored for an extended period of time at room temperature. When the stabilizers are used in large quantities in order to suppress the increase in viscosity for longer than periods, there is required higher temperatures and longer periods of time for curing. Further, there is an increased problem with phase separation during storage at room temperature because of poor compatibility between the stabilizers and the polysiloxanes. Still further, when such compositions are incorporated with an acetylene group-containing alcohol or acrylonitrile in a large quantity and cured with hot air of ca. 150° C., the curing of the compositions proceeds from the surface to the interior thereof, thereby resulting in the formation of wrinkled or roughened surface. This markedly reduces commercial value of cured products.

It is also proposed to use alkylene group-containing polyorganosiloxanes as additives for addition curable compositions (Japanese Patent Publication No. 3,774/79). Although the formation of wrinkled or roughened surface can be prevented in this case, the curing must be carried out under mild conditions at a temperature of around 100° C., and hence an undesirably long period of time is required for the curing. In addition, the additive is inferior in its effect for preventing increase in viscosity during storage at room temperature.

It is proposed in U.S. Pat. No. 4,032,502 to use as an additive for addition curable compostions the following silane compounds:

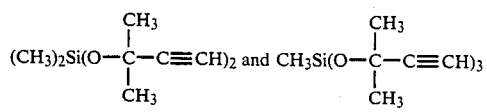

By the use of these stabilizers, there can be solved the problem of increase in viscosity during storage, as well as the problem of surface curing. However, long periods of time are required for the curing of compositions containing such stabilzers, in particular, when the compositions are cured under mild conditions. Therefore, the use of such stabilizers is disadvantageous in workability at the time of injection molding, or the like.

In Japanese Patent Publication No. 31,467/69 is disclosed for use in addition curable compositions a stabilizer a composition which is a product of alocoholysis of trimethoxysilane with an alcohol of the following formula:

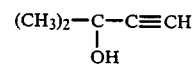

However, the product of the alcoholysis can be obtained only in the form of a mixture, and addition curable compositions obtainable by using a mixture as an additive suffer not only from viscosity increase during storage but also surface curing with hot air curing at elevated temperatures.

Accordingly, there can be obtained by the prior art no addition-curable polyorgasnosiloxanes which can be stored for long periods of time without increase in viscosity and which can be evenly cured in a short period of time under relatively mild conditions, without the formation of a wrinkled or roughened surface even when cured with hot air.

It is therefore an object of the present invention to provide a polyorganosiloxane composition which is free from the above disadvantages.

DETAILED DESCRIPTION OF THE INVENTION

Accordingly, there is provided by the present invention a polyorganosiloxane composition comprising:

(A) An alkenyl group-containing polyorganosiloxane containing structural units represented by the following general formula:

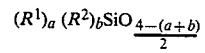

in which $R^1$ represents an alkenyl group; $R^2$ represents a substituted or unsubstituted monovalent hydrocarbon group containing no unsaturated fatty bonds; "a" represents an integer of from 1 to 3; "b" represents an integer of from 0 to 2; and (a+b) is an integer of from 1 to 3;

(B) A polyorganosiloxane containing structural units represented by the following general formula:

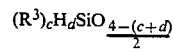

in which $R^3$ represents a substituted or unsubstituted monovalent hydrocarbon group; "c" represents an integer of from 0 to 3; "d" represents an integer of from 1 to 3; and (c+d) is an integer of from 1 to 3;

(C) A catalyst selected from the group consisting of platinum and a platinum compound; and (D) One or more compounds selected from the group consisting of (i) a silane compound represented by the following general formula:

$$(R^4)_n Si(OR^5)_{4-n}$$

in which $R^4$ represents a member selected from the group consisting of a hydrogen atom and a substituted or unsubstituted monovalent hydrocarbon group; $R^5$ represents a substituted or unsubstituted monovalent hydrocarbon group containing a $-C\equiv C-$ bond; "n" represents an integer of from 1 to 3; and at least one Si—H, Si—CH=CH$_2$ or Si—C≡CH bond is contained in the molecule and (ii) an organosilane compound obtainable by subjecting the above silane compound to addition reaction between Si—H and —C≡C— bonds contained therein.

Component (A) to be used in the composition of the present invention is an alkenyl group-containing polyorganosiloxane having alkenyl groups directly bonded to silicon atoms. The polyorganosiloxane may be straight chain, branched chain or a mixture of straight and branched chains. As examples of $R^1$ in the above-described general formula, mention may be made of a vinyl group, an allyl group, a 1-butenyl group, a 1-hexenyl group, and the like. Vinyl is most preferable with regard to ease of synthesis. As examples of $R^2$ and other organic groups to be bonded to the silicon atoms in the siloxane units, mention may be made of alkyl groups, such as methyl, ethyl, propyl, butyl, hexyl and dodecyl; aryl groups, such as phenyl; and aralkyl groups, such as 2-phenylethyl and 2-phenylpropyl. As other examples, mention may be made of substituted hydrocarbon groups, such as chloromethyl, 3,3,3-trifluoropropyl, and the like. Of these groups, methyl is most preferable with regard to ease of synthesis. Methyl is also preferred as to ability to maintain a low viscosity until the time of curing even where the polymerization degree of the polyorganosiloxane is large enough to give good physical properties to cured products. It is preferable that two or more alkenyl groups are contained in one molecule of polyorganosiloxane of Component (A).

The unit represented by the following formula:

$$(R^1)_a (R^2)_b SiO_{\frac{4-(a+b)}{2}}$$

in which $R^1$, $R^2$, "a" and "b" have the same meanings as defined above may be present either at the terminal positions or in the middle of the chain of the polyorganosiloxane molecule, or in both positions. It is preferable however that the unit be present at least at the terminal positions of the molecule, so as to provide good mechanical properties to the composition after being cured.

Component (B) to be used in the composition of the invention is a polyorganosiloxane, which functions as a cross-linking agent for Component (A). Examples of $R^3$ and other organic groups to be bonded to silicon atoms in the siloxy units include those mentioned for $R^2$ of Component (A). Of these groups, methyl is most preferable with respect to ease of synthesis. Such polyorganosiloxanes can be straight, branched or cyclic or can be a mixture of these.

As examples of Component (B), mention may be made of the followings:

(a) Branched polyorganohydrogensiloxanes consisting of (CH$_3$)$_2$HSiO$_{1/2}$ units and SiO$_2$ units;

(b) Straight chain polyorganohydrogensiloxanes represented by the following formula;

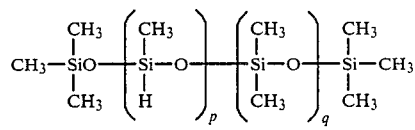

in which "p" represents an integer of from 3 to 100; and "q" represents an integer of from 0 to 100; and (c) Straight chain polyorganohydrogensiloxanes represented by the following formula:

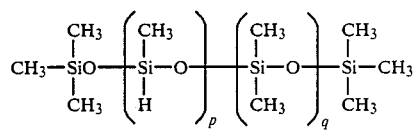

in which "p" represents an integer of from 1 to 100; and "q" represents an integer of for 0 to 100.

Component (B) is used in such an amount that the number of hydrogen atoms bonded to the silicon atoms in Component (B) is 0.25 to 4.0, preferably 0.3 to 3.0, per alkenyl group contained in Component (A). When the component is used in the above-described preferable range, the curing of the comosition proceeds smoothly thereby forming a hardened product having excellent properties in hardness, strength, etc. It can be preferable to use Component (B) which has a good compatibility with Component (A).

Component (C) of the composition is a catalyst selected from the group consisting of platinum and a platinum compound. The catalyst accelerates the addition reaction between an alkenyl group in Component (A) and a hydrosilyl group in Component (B). Examples of usable catalysts include elemental platinum (platinum black), chloroplatinic acid, platinum-olefin complexes, platinum-alcohol complexes, coordination compounds of platinum, and platinum supported on a carrier, such as alumina and silica. Chloroplatinic acid and platinum-olefin complexes are used preferably in the form of a solution in such a solvent as alcohols, ketones, ethers, hydrocarbons, and the like. Solid catalysts must be divided finely in order to secure good dispersibility. Carriers having a small particle size and a large specific surface area can be used with advantage for the supporting of platinum. Component (C) is used preferably in an amount (converted to platinum atom) of 0.1 to 500 ppm, based on Component (A). If it is less than 0.1 ppm, adequate catalytic effect will not be attained. On the other hand, even if it is used in an amount exceeding 500 ppm, there will be attained no further improvement in curing rate, or the like.

Component (D) is a characteristic component which provides storage stability at room temperature to the composition of the present invention, makes the temperature dependency of heat curing greater and, at the same time, imparts the ability of being evenly cured by means of hot air curing at elevated temperatures. It is essential that Component (D) contains at least one group selected from Si—H, Si—CH=CH$_2$ and Si—C≡CH, and at least one substituted or unsubstituted monovalent hydrocarbon group containing a —CH=CH— group bonded via an oxygen atom to a silicon atom.

In particular, Component (D) is capable of providing a marked temperature dependency for heat curing to the composition of the invention since it contains at least one group selected from Si—H, Si—CH=CH$_2$ and Si—C≡CH. This temperature dependency is far greater than expected from hitherto proposed additives, for example, the following:

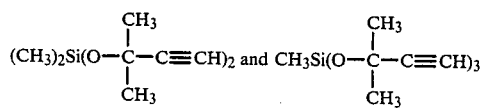

Of the above groups, Si—H and Si—CH=CH$_2$ are preferable with respect to ease of synthesis.

In the case where Component (D) is a silane compound represented by the general formula: $(R^4)_nSi(OR^5)_{4-n}$ in which $R^4$ and $R^5$ and "n" are as defined above, $R^4$ may be a group other than —H, —CH=CH$_2$ and —C≡CH, for example, alkyl groups, such as methyl, ethyl and propyl; aryl groups such as phenyl, etc.; and arylalkyl groups, such as 2-phenylethyl and 2-phenylpropyl. Part of the hydrogen atoms of these hydrocarbon groups may be substituted with chlorine and/or fluorine atoms.

As examples of $R^5$, mention may be made of the followings:

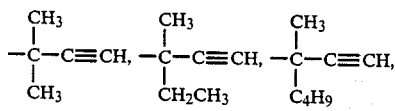

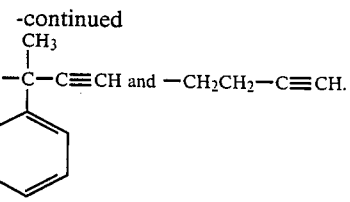

As described hereinbefore, "n" is an integer of from 1 to 3. With regard to the storage stability at room temperature of the composition, "n" is preferably 1 or 2.

Silane compounds to be used as Component (D) are synthesized preferably through dehydrochlorination between a chlorosilane represented by the general formula: $(R^4)_nSiCl_{4-n}$, in which $R^4$ and "n" have the same meanings as defined hereinbefore and an alcohol represented by the general formula: $R^5OH$, in which $R^5$ has the same meanings as defined hereinbefore. It can also be useful to use an acid receiving agent, such as pyridine, etc., along with the progress of the reaction.

When it is attempted to synthesize silane compounds of Component (D) through alcoholysis using a corresponding alkoxysilane instead of the above chlorosilane, the reaction does not proceed quantitatively and results in the formation of silanes with residual alkoxy groups. In cases where tri-methoxysilane is used as an alkoxysilane in the above reaction, there are formed by-products, for example, $R^5OSi(OCH_3)_3$. When such mixtures are used as Component (D) without purification, the surface curing at elevated temperatures and the reaction of the curable composition at room temperature that results in the increase in its viscosity during storage will not be suppressed sufficiently.

As Component (D) for the composition of the invention, there can be used, in addition to the silane compounds described hereinabove, organic silicon compounds that can be obtained from the above silane compounds through intermolecular addition reaction between SiH and —C≡C— groups. Such organic silane compounds can be obtained by simply heating the silane compounds.

As specific examples of silane compounds or organic silicon compounds usable as Component (D), mention may be made of the followings:

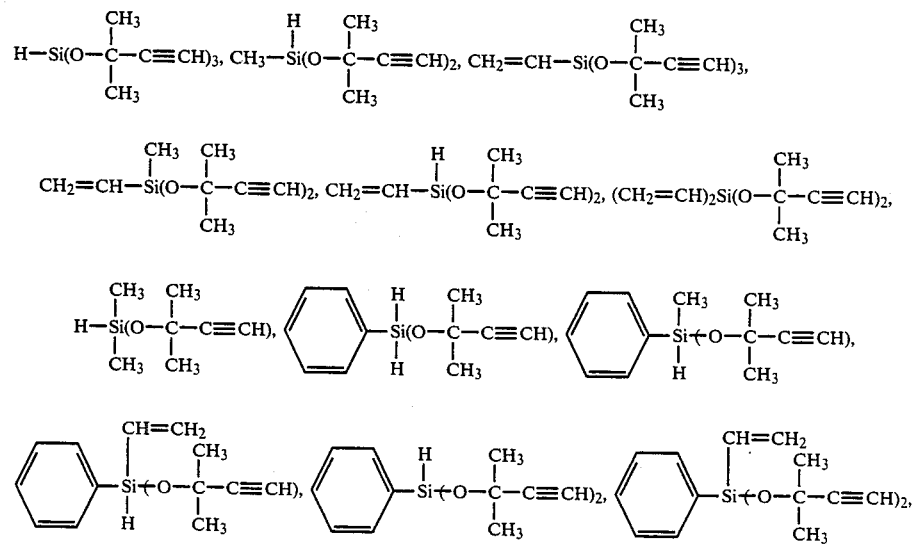

-continued

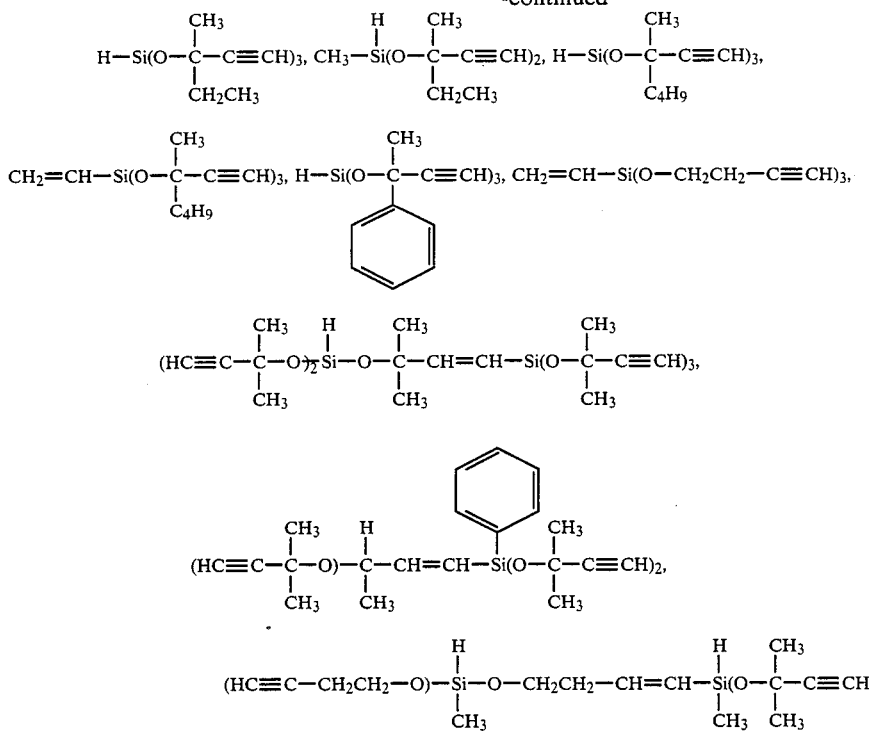

Component (D) is used in an amount which is sufficient to provide from 2 to 10,000 mg eq. of —C≡C— bonds, per g eq. of platinum of Component (C).

The composition of the invention can be prepared by simply admixing Components (A) to (D). If desired, the composition of the invention can be added with inorganic fillers, so as to attain appropriate fluidity, hardness after curing, tensile strength, elongation, modulus, etc. suited for particular uses. As examples of usable inorganic fillers, mention may be made of fumed silica, silica aerogel, precipitated silica, pulverized silica, diatomaceous earth, iron oxide, zinc oxide, calcium carbonate, magnesium carbonate, zinc carbonate, carbon black, and the like. These fillers can be used in any amount as long as the objects of the invention can be attained. The composition of the invention may also contain pigments, dyes and antioxidants. Furthermore, the composition can be dispersed into or diluted with an appropriate organic solvent, such as toluene xylene, depending on its end use.

The polyorganosiloxane composition of the invention can be stably stored at room temperature for long periods of time and, upon its heat curing, can be rapidly cured by a mild heating since the temperature dependence of its curing is by far greater than those of the hitherto known cmpositions. In addition, the composition can be evenly cured without forming wrinkled or roughened surface even when cured by hot air at elevated temperatures.

The polyorganosiloxane composition of the invention can be suitable as a potting material or a coating material for electric and electronic industries. Further, it can be used in other industries as dipping materials, rubber materials for the matrix of molding, materials for formign molds, coating materials for releasable paper, silicone rubbers of addition reaction type for dental impressions, silicone gels, silicon resins, and the like. The polyorganosiloxane composition of the invention can be produced with shortened production steps and has an extended workable period, and the use of the composition makes it possible to save energy required for curing. The composition is therefore highly useful.

EXAMPLES OF THE INVENTION

The invention will further be explained by way of examples. In the following examples, all the parts are based on weight.

Synthesis Example 1

Into a flask equipped with a dropping funnel, a condenser and a stirrer were charged 300 parts of toluene, 100.8 parts of 3-methyl-1-butyn-3-ol and 86.9 parts of pyridine, and the contents were stirred. Using a dropping funnel, 45.2 parts of trichlorosilane were gradually added thereto over 2 hours. White pyridine hydrochloride precipitated during the addition. The contents of the flask were heated under reflux for 4 hours cooled to room temperature, and the pyridine hydrochloride precipitate was removed by filtration. After the toluene in the filtrate has been removed by using an evaporator, the residue was distilled under reduced pressure to give 59 parts of Reaction Inhibitor (I) of the following formula:

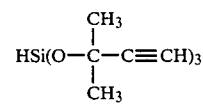

which is used in the composition of the invention. Inhibitor (I) was a colorless, transprent liquid and had a boiling point of 121° to 123° C. at 26 mmHg.

Synthesis Example 2

Reaction Inhibitors (II) to (IV) were prepared in a similar manner as in Synthesis Example 1, except that chlorosilanes shown in Table 1 were used instead of trichlorosilanes in amoutns shown in the same table. Physical properties of the silane compounds obtained are also shown in the table.

EXAMPLE 3

Composition 3 was prepared in a similar manner as in Example 1, except that Reaction Inhibitor (III) was used instead of Reaction Inhibitor (I). When the composition was allowed to stand at 25° C., its viscosity remained almost unchanged even after 1 day. However, when heated to 100° C., the composition cured com-

TABLE 1

| Kind of Chlorosilane | $CH_3(H)SiCl_2$ | $CH_2=CHSiCl_3$ | $CH_2=CH(CH_3)SiCl_2$ |
|---|---|---|---|
| Amount Dropped (Parts) | 57.5 | 53.8 | 70.5 |
| Reaction Inhibitor Synthesized | $CH_3-Si(O-\underset{\underset{CH_3}{\mid}}{\overset{\overset{H}{\mid}}{C}}-C\equiv CH)_2$ (II) | $CH_2=CH-Si(O-\underset{\underset{CH_3}{\mid}}{\overset{\overset{CH_3}{\mid}}{C}}-C\equiv CH)_3$ (III) | $CH_2=CH-Si(O-\underset{\underset{CH_3}{\mid}}{\overset{\overset{CH_3}{\mid}}{C}}-C\equiv CH)_2$ (IV) |
| Physical Properties of Reaction Inhibitor Obtained | | | |
| Appearance | Colorless Transparent | Colorless Transparent | Colorless Transparent |
| Boiling Point (°C./mmHg) | 82–84/26 | 84–86/2 | 101–103/28 |

EXAMPLE 1

To 100 parts of dimethylvinylsilyl stopped polydimethylsiloxane having a viscosity of 3,000 cp at 25° C., was added 0.04 parts of 1% chloroplatinic acid in isopropanol, and the mixture was homogeneously admixed. To this mixture was added 0.01 parts of Reaction Inhibitor (I) prepared in Synthesis Example 1, and the mixture was homogeneously admixed. Thereafter, 2 parts of trimethylsilyl stopped polymethylhydrogensiloxane having a viscosity of 40 cp at 25° C. and the main chains of the molecules being composed of 56% by mole of methylhydrogensiloxane units and 44% by mole of dimethylsiloxane units, was added to the above mixture, and the resulting mixture was stirred homogeneously and then defoamed under reduced pressure (2 mmHg) for 5 minutes to give Composition 1.

Composition 1 had a viscosity of 3,000 cp just after preparation. When the composition was allowed to stand for 1 day at 25° C., its viscosity remained almost unchanged, whereas it completely cured within ca. 2 minutes when heated to 100° C., not only in the case of closed heating but also in open heating. Moreover, the comosition formed a smooth surface without the formation of any wrinkles or unevenness on its surface, even when cured with a hot air of 150° C.

EXAMPLE 2

Composition 2 was prepared in a similar manner as in Example 1, expect that Reaction Inhibitor (II) was used instead of Reaction Inhibitor (I). When the composition was allowed to stand at 25° C., its viscosity remained almost unchanged even after 1 day. However, when heated to 100° C., the composition cured completely within ca. 1 minute. Moreover, when cured rapidly with hot air of 150° C., it formed a smooth surface, without the formation of any wrinkles of unevenness.

pletely within ca. 1.5 minutes. Moreover, when cured rapidly with hot air of 150° C., it fored a smooth surface, without the formation of any wrinkles of unevenness.

EXAMPLE 4

Composition 4 was prepared in a similar manner as in Example 1, except that Reaction Inhibitor (IV) was used instead of Reaction Inhibitor (I). When the composition was allowed to stand at 25° C., its viscosity remained almost unchanged even after 1 day. However, when heated to 100° C., the composition cured completely within ca. 1 minute. Morever, when cured rapidly with hot air of 150° C., it formed a smooth surface, without the formation of any wrinkles or unevenness.

Synthesis Example 3

Reaction Inhibitor (I) prepared in Synthesis Example 1 was heated with stirring under nitrogen atmosphere at 100° C. for 20 hours to give Reaction Inhibitor (V), i.e., a mixture of an intermolecular addition product of the following:

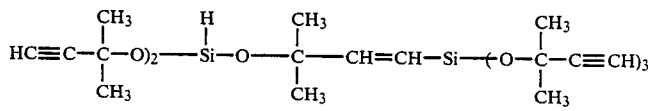

and an almost equal amount of Inhibitor (I).

EXAMPLE 5

To 100 parts of dimethylvinylsilyl stopped polydimethylsiloxane having a viscosity of 1,000 cp at 25° C., was added 0.04 parts of 1% chloroplatinic acid in isopropanol, and the mixture was homogeneously admixed. To this mixture was added 0.01 parts of Reaction Inhibitor (V) prepared in Synthesis Example 3, and the mixture was homogeneously admixed. Thereafter, 2 parts of polymethylhydrogensiloxane (the same one used in Example 1) was added thereto, and the resulting mixture was stirred homogeneously and defoamed under reduced pressure (2 mmHg) for 5 minutes to give Composition 5. This composition had a viscosity of 940 cp just after the preparation. When the composition was allowed to stand at 25° C., its viscosity remained almost unchanged even after 1 day. However, when heated to 100° C., it completely cured within ca. 1 minute. Moreover, the composition formed a smooth surface without the formation of any wrinkles or unevenness, even when cured with hot air of 150° C.

Comparative Example 1

Composition 6 was prepared in a similar manner as in Example 1, except that 3-methyl-1-butyn-3-ol was used instead of Reaction Inhibitor (I). The viscosity of the composition was 3,000 cp just after the preparation. When heated to 100° C. immediately after preparation, the composition completely cured within ca. 2 minutes. However, when it was rapidly heated with hot air of 150° C., uniformly cured products were not obtained because of formation of fine wrinkles on its surface. When it was allowed to stand at 25° C., its viscosity increased to 15,000 cp within 1 day.

Comparative Example 2

Composition 7 was prepared in a similar manner as in Example 1, except that 0.01 parts of alkyloxy group-containing polyorganosiloxane (VI) of the formula set forth below (prepared in accordance with the process disclosed in Japanese Patent Publication No. 3,774/79) was used instead of Reaction Inhibitor (I). The composition had a viscosity of 3,000 cp just after the preparation.

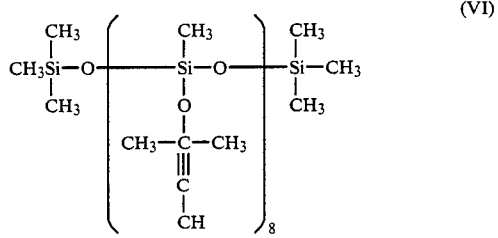

(VI)

When the composition was heated to 100° C. immediately after preparation, a period of about 15 minutes was required until it had been completely cured. When it was rapidly heated with a hot air of 150° C., no wrinkles or unevenness was formed on its surface. However, when it was allowed to stand at 25° C., its viscosity increased to 7,000 cp within 1 day.

Comparative Example 3

Composition 8 was prepared in a similar manner as in Example 1, except that a silane compound of the following formula:

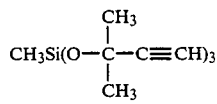

was used instead of Reaction Inhibitor (I). The composition had a viscosity of 3,000 cp just after preparation. When it was allowed to stand at 25° C. for one day, its viscosity remained almost unchanged. However, when heated to 100° C., it did not cure even after 30 minutes. When rapidly heated with a hot air of 150° C., there was obtained a cured product. However, a large number of wrinkles were formed on its surface, and the product was not cured uniformly.

Comparative Example 4

Composition 9 was prepared in a similar manner as in Example 1, except that a reaction product prepared by alcoholysis of a 3:1 (by mole) mixture of 3-methyl-1-butyn-3-ol and trimethoxysilane in the presence of a catalytic amount of tetrabutyl titanate was used instead of Reaction Inhibitor (I). The reaction product was a mixture of the following reaction products:

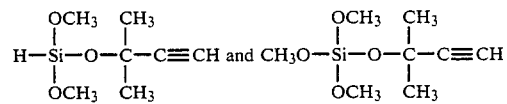

and unreacted starting materials. The composition had a viscosity of 3,000 cp just after preparation. When heated to 100° C. immediately after preparation, it completely cured within ca. 2 minutes. However, when rapidly cured with a hot air of 150° C., a large number of wrinkles were generated on its surface, and it did not cure uniformly. When the composition was allowed to stand at 25° C., its viscosity increased to 12,000 cp within 1 day.

What is claimed is:

1. A polyorganosiloxane comosition comprising:
   (A) An alkenyl group-contaiing polyorganosiloxane containing structural units represented by the following general formula:

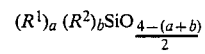

in which $R^1$ represents an alkenyl group; $R^2$ represents a substituted or unsubstituted monovalent hydrocarbon group containing no unsaturated fatty bonds; "a" represents an integer of from 1 to 3; "b" represents an integer of from 0 to 2; and (a+b) is an integer of from 1 to 3;
   (B) A polyorganohydrogensiloxane containing structural units represented by the following general formula:

$(R^3)_c H_d SiO_{\frac{4-(c+d)}{2}}$ in which $R^3$ represents a substituted or unsubstituted monovalent hydrocarbon group; "c" represents an integer of form 0 to 2; "d" represents an integer of from 1 to 3 and (c+d) is an integer of from 1 to 3;
   (C) A catalyst selected from the group consisting of platinum and a platinum compound; and
   (D) One or more compounds selected from the group consisting of (i) a silane compound represented by the following general formula;

$(R^4)_n Si(OR^5)_{4-n}$ in which $R^4$ represents a member selected from the group consisting of a hydrogen atom and a subsituted or unsubstituted monovalent hydrocarbon group; $R^5$ represents a substituted or unsubstituted monovalent hydrocarbon group containing a —C≡C— bond; "n" represents an integer of from 1 to 3; and at least one member selected from the group consisting of Si—H, Si—CH=CH$_2$ and Si- —C≡CH bonds is contained in the molecule and (ii) an organosilane compound obtainable by subjecting the above silane compound to addition reaction between Si—H and —C≡C— bonds contained therein.

2. A composition as defined in claim 1, wherein said Component (D) is a compound selected from the group consisting of HSi(OR$^5$)$_3$ and H·CH$_3$Si(OR$^5$)$_2$ wherein R$^5$ represents a substituted or unsubstituted monovalent hydrocarbon group containing a —C≡C— bond.

3. A composition as defined in claim 1, wherein said Component (D) is a compound selected from the group consisting of CH$_2$=CH—Si(OR$^5$)$_3$ and CH$_2$=CH·CH$_3$Si(OR$^5$)$_2$ wherein R$^5$ represents a substituted or unsubstituted monovalent hydrocarbon ghroup contaiing a —C≡C— bond.

4. A composition as defined in claim 1, wherein said group R$^5$ of component (D) is a

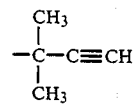

group.

5. A composition as defined in claim 1, wherein said silane compound of Component (D) is a compound obtainable by dehydrochlorination between a chlorosilane represented by the following general formula:

$$(R^4)_n SiCl_{4-n}$$

in which R$^4$ represents a member selected from the group consisting of a hydrogen atom and a substituted or unsubstituted monovalent hydrocarbon group and an alcohol represented by the following general formula:

$$R^5 OH$$

in which R$^5$ represents a substituted or unsubstituted monovalent hydrocarbon group containing a —C≡C— bond.

* * * * *